APPARATUS FOR SENSING AND REPRODUCING PERFORATIONS

Filed Sept. 15, 1959 6 Sheets-Sheet 1

INVENTORS
William H. Dreyer
Heinz W. Schretter
By
Wolfe, Hubbard, Voit & Osann
Attys.

INVENTORS.
William H. Dreyer
Heinz W. Schreiter
By
Wolfe, Hubbard, Voit & Osann
Attys.

APPARATUS FOR SENSING AND REPRODUCING PERFORATIONS

Filed Sept. 15, 1959 6 Sheets-Sheet 3

INVENTORS.
William H. Dreyer,
Heinz W. Schreiter,
By
Wolfe, Hubbard, Voit & Osann
Attys.

INVENTORS.

William H. Dreyer,
Heinz W. Schreiter

By Wolfe, Hubbard, Voit & Osann Attys.

Aug. 14, 1962 W. H. DREYER ET AL 3,049,286

APPARATUS FOR SENSING AND REPRODUCING PERFORATIONS

Filed Sept. 15, 1959 6 Sheets-Sheet 5

INVENTORS.
William H. Dreyer
Heinz W. Schreiter,
By
Wolfe, Hubbard, Voit & Osann
Attys

APPARATUS FOR SENSING AND REPRODUCING PERFORATIONS

Filed Sept. 15, 1959 6 Sheets-Sheet 6

INVENTORS.
William H. Dreyer
Heinz W. Schreiter
By
Wolfe, Hubbard, Voit & Osann
Attys.

United States Patent Office 3,049,286
Patented Aug. 14, 1962

3,049,286

APPARATUS FOR SENSING AND REPRODUCING PERFORATIONS

William H. Dreyer, Skokie, and Heinz W. Schreiter, Chicago, Ill., assignors to Cummins-Chicago Corp., Chicago, Ill., a corporation of Illinois Filed Sept. 15, 1959, Ser. No. 840,111
7 Claims. (Cl. 234—51)

The present invention has to do with apparatus for sensing patterns of perforations in a first record or document, and reproducing those same patterns of perforations in a second record or document. This invention is particularly concerned with the reproduction of perforations at selected stations of rectangular perforation fields.

In modern business accounting systems, the use of data processing apparatus or computers is not becoming widespread. A fairly large amount of information may, in such systems, be represented by a compact array of "coded" indicia which may not be visually legible but which may be mechanically or electrically "read" by the input components of data processing apparatus. For example, any of thirty-two characters may be represented by different combinations of "spots" or indicia in the five places of a five-place, in-line code. A given document or business record may thus have recorded thereon eleven characters represented by eleven lines of five places each, i.e., a rectangular array of stations which is 5 x 11 stations in size. If the "spots" or indicia applied at selected stations to represent different characters are in the form of small perforations, it is entirely feasible to compress all of the indicia for eleven characters into a perforation field which takes up an area of only about one inch by one-quarter inch.

As a typical example of advantageous use of such compact, coded information, consider the process of developing reels of exposed movie film which have been sent in by different film dealers to a commercial developing center. During the developing process each reel of film is separated from the identifying box or label which originally contained it. It has been the prior practice to mark the box and the film with the same number, and then to rematch that box with the film after the developing of the latter is complete. Billing and re-shipping of the film is done with reference to the label carried on the film box.

If, however, the essential information on the film box can be applied directly to the film, and later read therefrom after the film has been developed, the need to rematch each reel of film with its original box or label may be entirely eliminated, and at a material saving in trouble and expense.

Such elimination is possible if the box or label originally accompanying the film includes a document or record device, such as a separable tag, which carries all of the pertinent information in condensed, coded form. Desirably, the information on the tag is represented by a coded rectangular array of perforations, and these can be transferred to the leading end of the film without requiring appreciable space thereon. Subsequently, these perforations in the leading end of the film can be sensed and reconverted into legible information which indicates the address to which the developed film should be shipped, and also the amount the addressee is to be billed for the developing work. Where very large numbers of reels of films from a variety of different dealers or sources are being so developed and processed, the elimination of the prior necessity of matching each developed reel of film to its original box or label constitutes a great saving in time and expense.

It is the general aim of the invention to facilitate and render more convenient the sensing of perforations in one record and their duplication in a second record. While not so limited in its application, the invention will find especially advantageous use in transferring coded perforations from a tag accompanying undeveloped film to the leader of the film, so that the film itself carries all of the information required for its re-shipment and billing.

A more specific object of the invention is to provide a new sensing and perforating head characterized by its ability to sense perforations at stations which are very closely spaced, and its ability to reproduce perforations at stations which are very closely spaced.

Another object of the invention is to provide such perforation duplicating apparatus in which the spacing between adjacent stations in the perforation field applied to a second document may be made different from the corresponding spacings which exist in the perforation field of a first document that is sensed.

It is an additional object to assure that probes which are employed to sense the presence or absence of perforations at different stations in a first document are always affirmatively returned to their original position after they have been deflected or shifted by the sensed document.

It is a further object of the invention to make possible selective application of special indicia to a second document at the time that coded perforations indicia are duplicated in that second document from a first document. In this connection it is a related object to provide means for selectively applying special indicia to the second document while assuring that such indicia will be applied only if there is an affirmative selection of it by the operator for each cycle of machine operation.

Still another object of the invention is to provide perforation reproducing apparatus of the general nature indicated above and which is power-actuated, while nevertheless assuring that the perforating operation of the apparatus cannot proceed unless a first document or master document is alined and fully positioned properly with respect to sensing probes.

Another object is to provide such a perforation-reproducing apparatus in which the operation cannot proceed unless the second document to receive the perforated indicia is fully positioned opposite the perforating punches.

It is also an object to substantially eliminate the possibility that two successive second documents will erroneously received coded information from the same first document.

Finally, it is an object of the invention to provide perforation-reproducing apparatus which is small and compact in size, and which may be conveniently and reliably operated by unskilled workers, even in the subdued red light of photographic dark rooms.

Other objects and advantages will become apparent as the following description proceeds, taken in conjunction with the accompanying drawings, in which.

Figures 9, 10, 11:
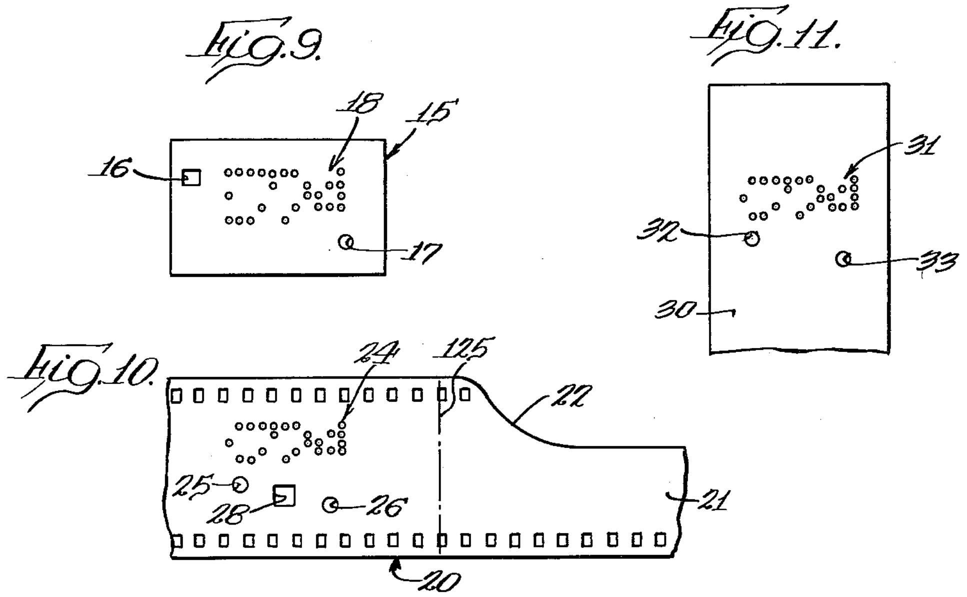
FIG. 9 illustrates a typical first document or tag containing perforations in a rectangular field which are to be duplicated.
Figure 12:
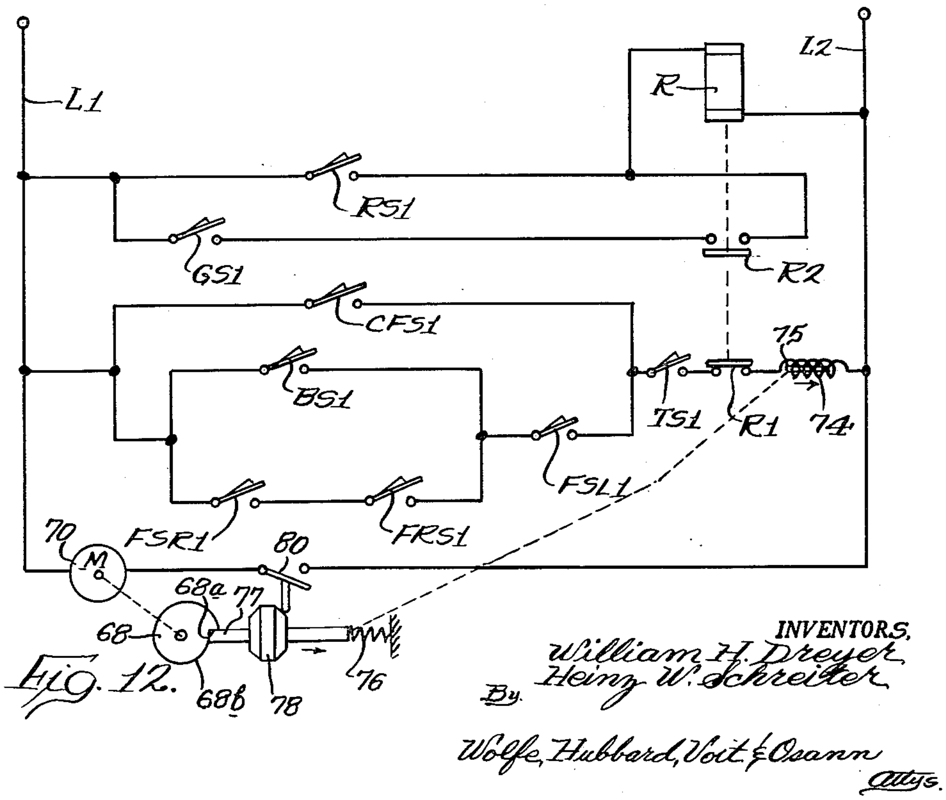

FIGS. 10 and 11 respectively illustrate the ends of two different types of film to which perforations have been applied by illustrated appartus; and FIG. 12 is a schematic wiring diagram of the controls for the perforation reproducing apparatus.

While the invention has been shown and will be described in some detail with reference to a particular embodiment thereof, there is no intention that it thus be limited to such detail. On the contrary, it is intended here to cover all modifications, alternatives, and equivalents falling within the spirit and scope of the invention as defined by the appended claims.

Figure 1:
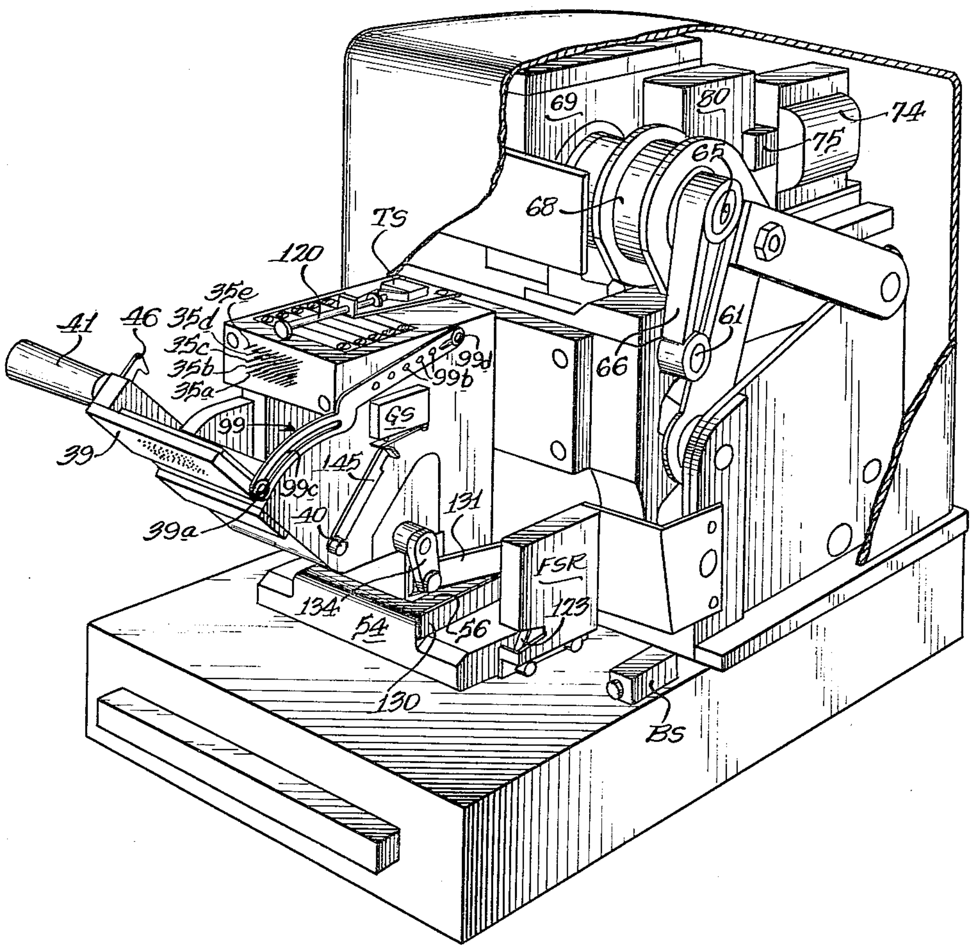
FIGURE 1 is a perspective view of perforation sensing and reproducing apparatus embodying the features of the present invention and shown with the exterior casing or cover removed.

The exemplary embodiment of the invention shown in FIG. 1 is intended to successively accept first documents in the form of perforated tags, and to reproduce the perforations in each such tag in a corresponding second document, e.g., in the end of a film strip. A typical tag 15 is shown in FIG. 9 as containing two large holes 16, 17 which are punched with reference spacing from a rectangular perforation field 18. The field 18 is in the present instance made up of fifty-five stations arranged in eleven columns and five rows. Each station, represented by the intersection of imaginary vertical and horizontal lines, may be blank or may have a perforation punched therein, the particular combination of perforations in each column representing a particular character according to a predetermined code. The particular code employed and the meaning of the various characters represented by the perforations in the eleven columns, is not necessary to an understanding of the invention, and the description will thus not be unduly lengthened by such details. It may be observed as a matter of interest, however, that the perforation stations in the field 18 of the tag 15 are in the present instance spaced apart .087 inch center-to-center, and that each perforation has a diameter of 0.05 inch. The area required for the perforation field 18 is, therefore, quite small.

The second documents or records which are to receive reproductions of the perforation patterns in corresponding first documents are film strips such as those shown in FIGS. 10 and 11. The film strip 20 of FIG. 10 is a 35 mm. film with a reduced width leader 21 formed by a curved radius 22. The film strip 20 has sprocket holes therein and is perforated by the present apparatus to have a perforation field 24 containing perforations at locations corresponding to the perforations in the field 18 of the tag 15. At the time the perforations are created, two locator holes 25, 26 are also perforated with reference spacing from the field 24. A special hole 28 is also selectively perforated adjacent the field 24 for a purpose which will be described below.

It will be observed that the rectangular perforation field 24 in the 35 mm. film strip 20 is oriented with its longest dimension parallel to the length of the film strip. It may also be observed by comparing FIGS. 9 and 10 that the vertical rows of perforation stations in the field 24 are spaced horizontally apart by the same distance which separates the rows of the perforation field 18 in the tag 15. However, the vertical spacing between the adjacent rows in the field 24 is less than the corresponding vertical spacing in the field 18, the present apparatus serving to change, i.e., compress, the vertical spacing between stations of the field 24 as compared with the field 15 while producing exactly the same pattern of perforations, The film strip 30 in FIG. 11 is somewhat wider than the 35 mm. film strip 20 shown in FIG. 10. The perforation field 31 applied to the strip 30 is oriented transversely across the strip. Locator holes 32 and 33 having reference spacing from the field 31 are applied at the time the perforations are made. The manner in which the present apparatus duplicates the perforations of the tag 15 in either of the film strips 20 or 30 will be made clear below.

In the following description, reference will be made to the tag 15 and the film strip 20. It will be understood, however, that a plurality of tags and a corresponding plurality of film strips are operated upon successively by the apparatus, and that the "first" documents (those having perforations existing therein) and the "second" documents (those which are to have perforations created therein) may take a variety of forms.

In keeping with the invention, means are provided to mechanically sense the presence or absence of a perforation in each station of the field 18 in the tag 15. For this purpose, a plurality of feelers or probes (FIG. 5) are arranged in a rectangular array (FIG. 3) and with spacing corresponding to the spacing of the perforation stations in the field 18 of the tag 15. The probes in the five horizontal rows are designated by the respective reference characters **35*a*–35*e*, there being eleven probes in each row, thus forming eleven columns. The probes 35*a*–35*e* are pin-like in shape and are mounted with freedom for end-wise movement in a head 36 of the apparatus, the forward ends of the probes (on the left as viewed in FIG. 5) all being normally alined in one plane. As here shown, the probes 35*a*–35*e* are slidably supported in alined passages bored through guide plates 38 which are bolted to the head 36**.

In order to position the tag 15 so that its field 18 will be alined with the rectangular array of the ends of the probes **35*a*–35*e* and to affirmatively shift the tag 15 against such probe ends, a movable member or gate 39 is carried by a shaft 40 which is journaled in the head 36. The gate 39 may be manually rocked between an open position (FIG. 1) and a closed position (FIGS. 3 and 5) by an operator grasping a handle 41. The gate 39 on its inner face carries two projecting locator studs 44 and 45 which are adapted to be received snugly in the openings 16, 17 of the tag 15 as the latter is slipped against the inner face of the gate. The locator studs 44, 45 are so positioned that when the gate 39 is rocked to its closed position the tag 15 located by the studs will have the fifty-five stations of its perforation field 18 alined precisely with the projecting ends of the corresponding probes 35*a*–35*e*** (see FIG. 5).

It will be apparent, therefore, that when the tag 15 is slipped onto the locator studs 44, 45 of the gate 39, and the latter rocked fully to its closed position (FIG. 5), certain ones of the probes **35*a*–35*e* will find perforations at the corresponding stations in the field 18 of the tag 15. Accordingly, the tag 15 will leave these probes in their original positions, and such probes will project through the tag and into one of a plurality of passages 37*a*–37*e* bored in the gate itself at the respective perforation stations. However, those ones of the probes which find no perforation in the field 18 of the tag 15 will be affirmatively shifted to the right (as viewed in FIG. 5) by the tag 15 as the latter is moved with the gate to its fully closed position. Thus, the particular combination of perforations which appear in the field of the tag 15 is "sensed" by the probes 35*a*–35*e*** in that the probes which correspond to perforations are left in their original positions, and the probes which correspond to blank areas are shifted in an end-wise direction to the right.

When the gate 38 has been moved to its fully closed position, a snap-acting latch member 46 will hold it closed, this latch being readily released upon slight rotation of the handle 41. Thus, the operator can release the gate 39 so that it returns to its open position under the influence of a leaf spring 48 simply by rotating the handle 41. The details of this mechanism are not shown in the drawings.

Figure 5:
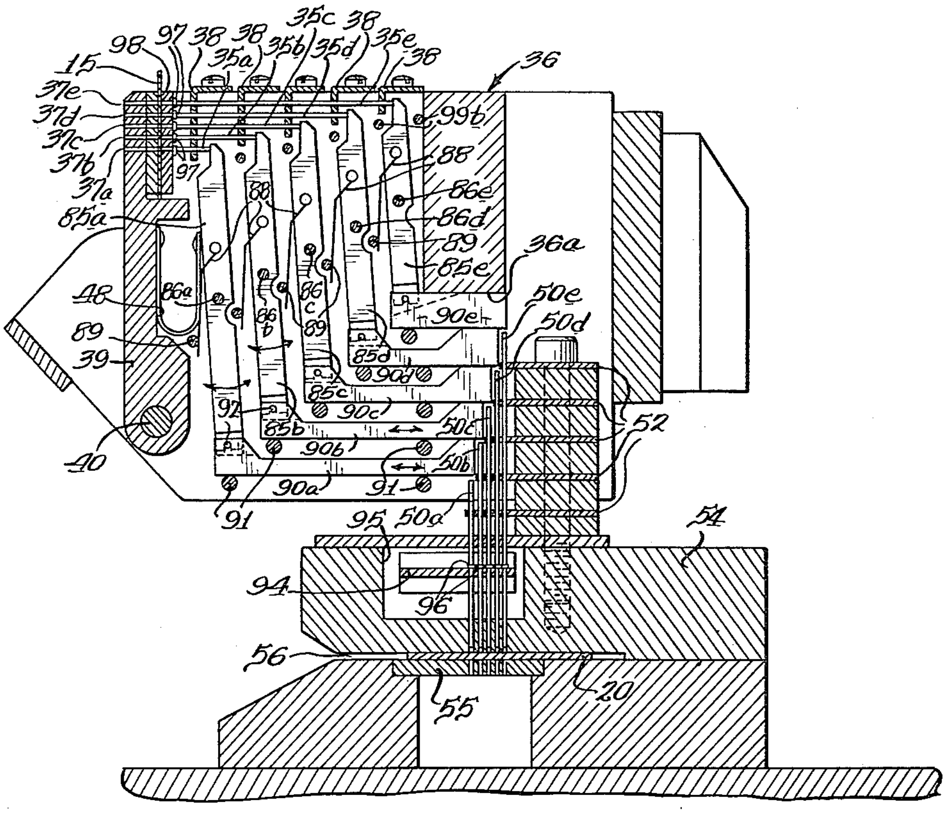
FIG. 5 is a vertical section taken substantially along the line 5—5 in FIG. 3 and showing particularly the probes, punches and interposer linkages.

To produce perforations in the "second" documents or, in this instance, the film strip 20, a plurality of movable punches are disposed in a rectangular array with one punch corresponding to each perforation station. The punches in the five rows are designated by the respective reference characters **50*a*–50*e*, there being eleven punches in each such row. As shown best in FIG. 5, the several punches 50*a*–50*e* are disposed at right angles to the probes; and they are slidably mounted for end-wise movement within a plurality of spaced guides 52 which are separated by spacers and rigidly bolted to a base 54 of the machine. The lowermost ends of the punches 50*a*–50*e* are normally alined with one another as shown in FIG. 5 and overlie a die block 55 which has a plurality of openings 53*a*–53*d* therein (FIG. 7), each located to receive a corresponding one of the punches when the latter is moved downwardly. The die block 55 is separated from the ends of the punches 50*a*–50*e* by a slot 56 formed in the base 54 to receive the film strip 20. With the film strip fully inserted into the slot 56 it underlies the lower ends of the punches and will be perforated by those ones of the punches which are affirmatively moved downwardly into the die block 55**.

To produce this downward movement of selected ones of the punches **50*a*–50*e*, provision is made to reciprocate the entire head 36 downwardly and upwardly relative to the stationary base 54. As here shown best in FIG. 2, the head 36 is supported by pins 60 and 61 which are carried at the forward ends of two parallel links 62, 63 journaled on pintles 64, 65 carried by the frame of the machine. This support of the head 36 by the parallel links 62, 63 assures that the head reciprocates with linear motion as an eccentric pin 65 coupled by a pitman 66 to the link 63 executes one revolution. The eccentric 65 is carried on the output member of a one-revolution clutch 68 having its input member connected to the output of a speed-reducing gearbox 69. Mechanical power input to the gearbox 69 is derived from an electric motor 70 having a worm gear 71 on its output shaft meshing with a cooperating worm wheel 72 which forms the input to the gearbox 69**.

To initiate one cycle of reciprocation of the head 36, the motor 70 is energized and a solenoid 74 is energized to retract its armature 75 against the bias of a spring 76. This armature is coupled to a pin 77 which is thus withdrawn from an abutment **68*a* formed in the surfaces of one of the elements of the one-revolution clutch 68. Accordingly, the latter drives the eccentric 65 through one revolution after which the pin 77 snaps back into blocking engagement with the abutment 68*a*. Withdrawal of the armature 75 also shifts a cam 78 inwardly (FIG. 2) thereby actuating a motor control switch 80, the latter being deactuated as the eccentric 65 completes one revolution and the pin 77** snaps back to its original position.

It will thus be apparent that the head 36 is associated with power means to effect vertical reciprocation thereof relative to the stationary base 54. The manner in which the power means are controlled will be more fully explained below.

In keeping with one of the more important aspects of the present invention, selected ones of the punches **50*a*–50*e* which correspond to those ones of the probes 35*a*–35*e* which sense a hole in the tag 15 are caused to move downwardly through punching cycles whenever the head 36 is reciprocated. For this purpose, an interposer linkage is interconnected between each one of the probes and the corresponding one of the punches, such interposer linkage being arranged normally to engage and move the associated punch downwardly when the head 36** reciprocates.

With so many punches (in the present example, fifty-five), closely spaced in a rectangular array and with a corresponding number of probes so closely spaced, it is a problem to arrange interconnecting mechanisms between the two which will fit within the limited space available. As shown best in FIG. 5, this difficulty or space problem is overcome by making the probes in the successive rows **35*a*–35*e* progressively greater in length so that their inner, i.e., right ends as viewed in FIG. 5, are staggered in position. With this arrangement, it becomes feasible to employ a plurality of relay arms arranged in five rows 85*a*–85*e* which are respectively associated with the probes in the five rows of probes 35*a*–35*e*. It will be understood from FIG. 5 that there are eleven probes in each of the rows 35*a*–35*e* and eleven of the relay arms in each of the rows of relay arms 85*a*–85*e*. The relay arms for each of the rows 85*a*–85*e* are mounted for rocking movement about pivot rods 86*a*–86*e* which extend across the head 36. The upper ends of the relay arms 85*a*–85*e* have one-way connections with the respective probes 35*a*–35*e* and, as here shown, are simply disposed adjacent the right ends of those probes so as to be rocked clockwise (as viewed in FIG. 5) in response to rearward shifting of such probes. Each of the relay arms 85*a*–85*e* is biased in a counterclockwise direction by means of a leaf spring 88 fixed to that arm and reacting against stationary cross bars 89. Thus, it will be apparent that each of the relay arms 85*a*–85*e*** normally occupies the position shown in FIG. 5, but that it will be rocked clockwise in response to inward shifting of the associated probe.

In order to convert this selective movement of the relay arms **85*a*–85*e* into actuation of those punches 50*a*–50*e* which correspond to probes 35*a*–35*e* finding a perforation in the tag 15, a plurality of interposers disposed in five rows 90*a*–90*e* are connected with respective ones of the relay arms 85*a*–85*e* and arranged normally to overlie the upper ends of the respective rows of punches 50*a*–50*e*. The interposers 90*a*–90*e* are horizontally slidable on stationary support bars 91, each interposer being notched to clear the bars above it. The right ends of the interposers stack on one another and those in the row 90*e* bear on a surface 36*a* in the head. This prevents vertical movement of the interposers relative to the head 36. The left end of each interposer carries a pivot pin 92** which fits into a notch cut in the lower end of the corresponding relay arm, thereby establishing a pivot connection for converting rocking movement of the relay arm into linear movement of the interposer.

To make it possible for each of these interposers to act on a corresponding one of the punches, the punches in the successive rows **50*a*–50*e* are made of progressively greater length so that their upper ends have a staggered spacing. Moreover, the interposer linkages in successive rows are made progressively shorter, i.e., the relay arms in the successive rows 85*a*–85*e* are made progressively shorter in length and the interposers in the successive rows 90*a*–90*e* are also made progressively shorter in length. Thus, each of the interposers 90*a*–90*e* overlies the upper end of the corresponding one of the punches 50*a*–50*e* when the associated relay arm 85*a*–85*e* occupies its normal position. Assuming that none of the probes 35*a*–35*e* are shifted endwise by engagement with the tag 15 then all of the interposers 90*a*–90*e* will engage the upper ends of the punches 50*a*–50*e* and affirmatively shift the latter downwardly to create perforations in the film strip 20 disposed in the slot 56 as the head 36** moves downwardly.

With the tag 15 held by the closed gate 39, a certain combination of the probes **35*a*–35*e* will be left undeflected, since they will pass through perforations in the field of the tag. On the other hand, those ones of the probes 35*a*–35*e* which find no perforations at the corresponding stations in the tag 15 will be shifted to the right as viewed in FIG. 5, and will thus rock the corresponding relay arms 85*a*–85*e* counterclockwise about the pivot rods 86*a*–86*e*. This, in turn, will shift the corresponding ones of the interposers 90*a*–90*e* to the left as viewed in FIG. 5, thereby retracting them from the upper ends of the corresponding punches 50a–50e. Then, as the head executes its downward motion, those retracted interposers will simply clear the associated punches so that the latter move, if at all, only under the influence of gravity and thus do not produce perforations in a document or film strip disposed in the slot 56. In this way, a perforation is produced in the film strip 20 for each perforation in the tag 15**, such perforations all being similarly located in a rectangular array of perforation stations.

Figure 6:
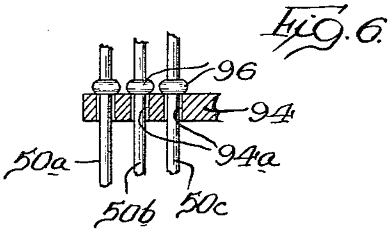
FIG. 6 is an enlarged detail, corresponding to a part of FIG. 5, and showing the arrangement for lifting the punches.

To affirmatively elevate and return all of the punches 50a–50e to their original positions after a punching cycle, a lifter plate 94 fixed to the head 36 is disposed in a pocket 95 of the base 54. The plate 94 has holes 94a (FIG. 6) through which the punches 50a–50e slidably project. An oversize shoulder 96 is formed on each punch so that the plate 94 will engage therewith and return all punches to the position shown.

As previously noted, the relay arms 85a–85e are each yieldably biased in a counterclockwise direction (FIG. 5) by the individual springs 88. These springs normally cause each relay arm to bias the corresponding probe to the left until a shoulder 97 on each pin engages a guide plate 98 having an opening therein for each probe. It has been found, however, that reliance cannot be placed on the small relatively weak springs 88 to return the probes 35a–35e to their original positions after they have been sihfted to the right by a tag 15 carried on the gate 39. Some probes might possibly stick in their deflected positions, causing no punching action by the corresponding ones of the punches 50a–50e, even though successive tags might have perforations in the corresponding stations. This "sticking" of probes might go unnoticed for some time and result in serious errors.

In order to overcome such difficulty, provision is made to affirmatively return all shifted probes to their original positions after each sensing operation. More specifically, a lost motion connection is established between the movable member or gate 39 and the several probes 35a–35e so that when the gate is opened the previously shifted probes are shoved to the left (FIG. 5) until their shoulders 97 engage the guide 98.

As here illustrated in detail, a comb-like piece 99 is formed with a frame 99a from which teeth 99b extend transversely. Each tooth 99b is in the form of a rod which extends across the head 36 and is disposed back of the upper ends of the relay arms in one of the rows 85a–85e. The comb-like teeth are positioned free of the arms 85a–85e when the gate 39 is closed, and are pulled into engagement with such arms to affirmatively shift the associated probes to the left (FIG. 5) when the gate 39 is opened. This is accomplished by a lost-motion connection from the frame 99a to the gate 39, and specifically by an arcuate slot 99c formed in the frame and receiving a pin 39a fixed to the gate 39. The right end of the frame 99a is slotted to have limited movement relative to a pin 99d fixed to the head. Thus, as the gate 39 is rocked between its opened and closed positions, the pin 39a will engage the left or the right end of the slot 99c and will affirmatively shift the frame 99a and the teeth 99b to the left or right. In the first position, the teeth 99b will rock the relay arms 85a–85e counterclockwise so that they engage the corresponding probes 35a–35e and shift the latter to their "home" positions, i.e., with the shoulders 97 against the guide 98. In the second position, with the gate 39 closed, the teeth 99b are clear of the relay arms (see FIG. 5) and thus do not interfere with the movement of the probes according to the perforations sensed in the tag 15.

As noted previously in connection with FIG. 10, it may be desirable in many instances to make it possible for the operator of the apparatus to produce a special identifying hole at the same time that the perforation field is punched in the film strip 20. In the processing of film, for example, the operator may cause this special square-shaped hole 28 to be produced in the film when the latter is to be cut into separate frames and mounted as slides rather than to be processed conventionally as movie film. Yet, it is desirable that this special square hole 28 only be produced in those film strips 20 which require it, and thus only when the operator affirmatively calls for that special hole.

In order to permit this selective punching of a special character or hole 28 in film strips 20 as they are placed in the apparatus, a special punch 100 (FIG. 3) is movably carried in the base 54 and so located that it can enter a square hole 101 in the die block 55 (FIG. 7) when the head 36 moves downwardly. However, the special punch 101 is slidably mounted in the base and will not ordinarily be affirmatively shifted downwardly by the head 36 since the latter is formed with a cut-out or opening 102 (FIG. 8) overlying the upper end of the special punch 100. Unless this opening is covered, downward movement of the head 36 will not affiirmatively shift the punch 100 downwardly.

Figure 8:
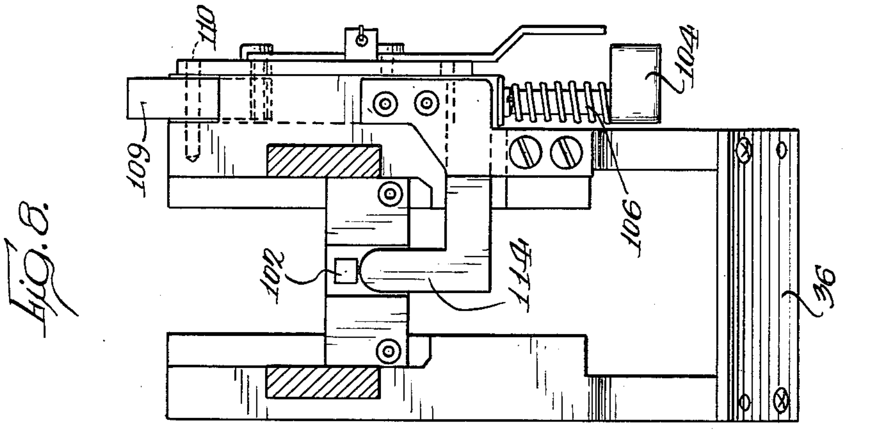
FIG. 8 is a sectional view looking upwardly substantially along the line 8—8 in FIG. 3 and illustrating the interposer for the special punch.

When the operator desires to cause a special square hole 28 to be perforated in the film strip 20 disposed in the slot 56, he presses a pushbutton 104 carried at the left side of the head 36 and normally biased outward by a spring 106 (FIG. 8). Such depression of the pushbutton 104 shifts a latch plate 108 (FIG. 4) inwardly and causes a latch 109, pivoted at 110 and biased in a counterclockwise direction by a spring 111, to engage a latching finger 112. This holds the pushbutton slide 108 inwardly after the operator has only momentarily depressed it. Attached to the slide 108 is an interposer 114 (FIG. 8) which is accordingly shifted to overlie the upper end of the special punch 100. Downward movement of the head 36, therefore, will cause the interposer 114 to force the punch 100 downwardly so that the latter punches a square hole in the film strip 20.

Figure 4:
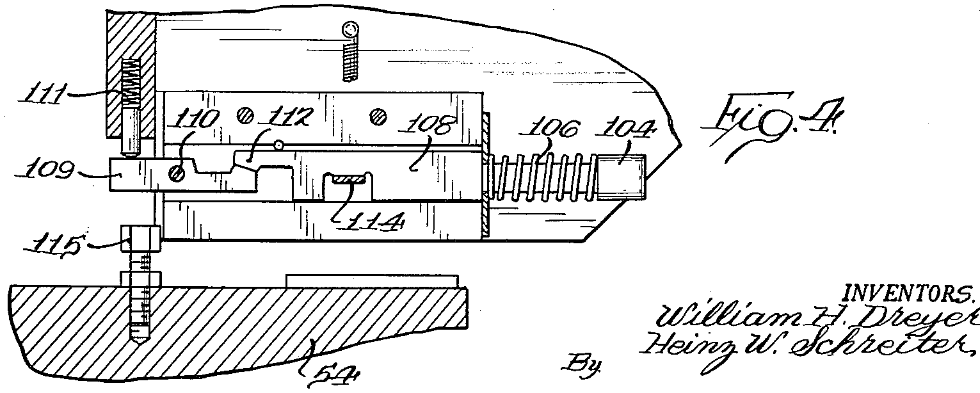
FIG. 4 is a fragmentary section, taken substantially along the line 4—4 in FIG. 3 and illustrating the details of a manual selector and latch associated with a special punch.

Referring to FIG. 4, it will be seen that such downward movement of the head 36 will bring the left end of the latch 109 into contact with an adjustable stop 115 carried on the base 54. Such engagement will rock the latch 109 clockwise about the pin 110 so that it disengages the latch finger 112, thereby permitting the spring 106 to return the pushbutton 104, the latch slide 108, and the interposer 114 to their original postiions. The latching means 108, 109 and the releasing stop 115 thus assure that the interposer 114 will be withdrawn after each reciprocation of the head 36. Only one film strip 20 will be perforated with the special hole 28 in response to each depression of the pushbutton 104. The operator cannot inadvertently cause the special hole to be produced in a succession of film strips by forgetting the pushbutton 104, since the latter is always released after one cycle of operation. The operator must affirmatively depress the pushbutton 104 prior to each cycle of movement of the head 36 if he desires to produce a special hole 28 in the film strip 20 which is to be perforated during that cycle.

The locating holes 25 and 26 (FIG. 10) are punched in every film strip at the time the perforation field is punched. For this purpose, the base 54 carries movable locating punches 116, 117 (FIG. 3) adapted to enter corresponding holes 118, 119 in the die block 55 during each punching cycle. The lifter plate 94 coacts with the punches 100, 116 and 117 to assure that they return to their original positions in the same manner previously described with reference to the perforating punches in FIG. 6.

In the use of the apparatus as thus far described, it is expected that the operator will be processing a large number of paired tags 15 and films having end strips 20. That is, there will be a relatively large number of boxes come to the operator of the machine, there being a tag with each box and a roll of film therein. It is the operator's job to insert the tag into the gate 39 and the corresponding film strip into the slot 56 of the machine to assure that the latter is perforated in accordance with the former. Yet, the operator's work must be smoothly and quickly performed and without mix-up of tags and film, i.e., each film must be perforated with the pattern of holes in the particular tag which originally accompanied it.

Figure 2:
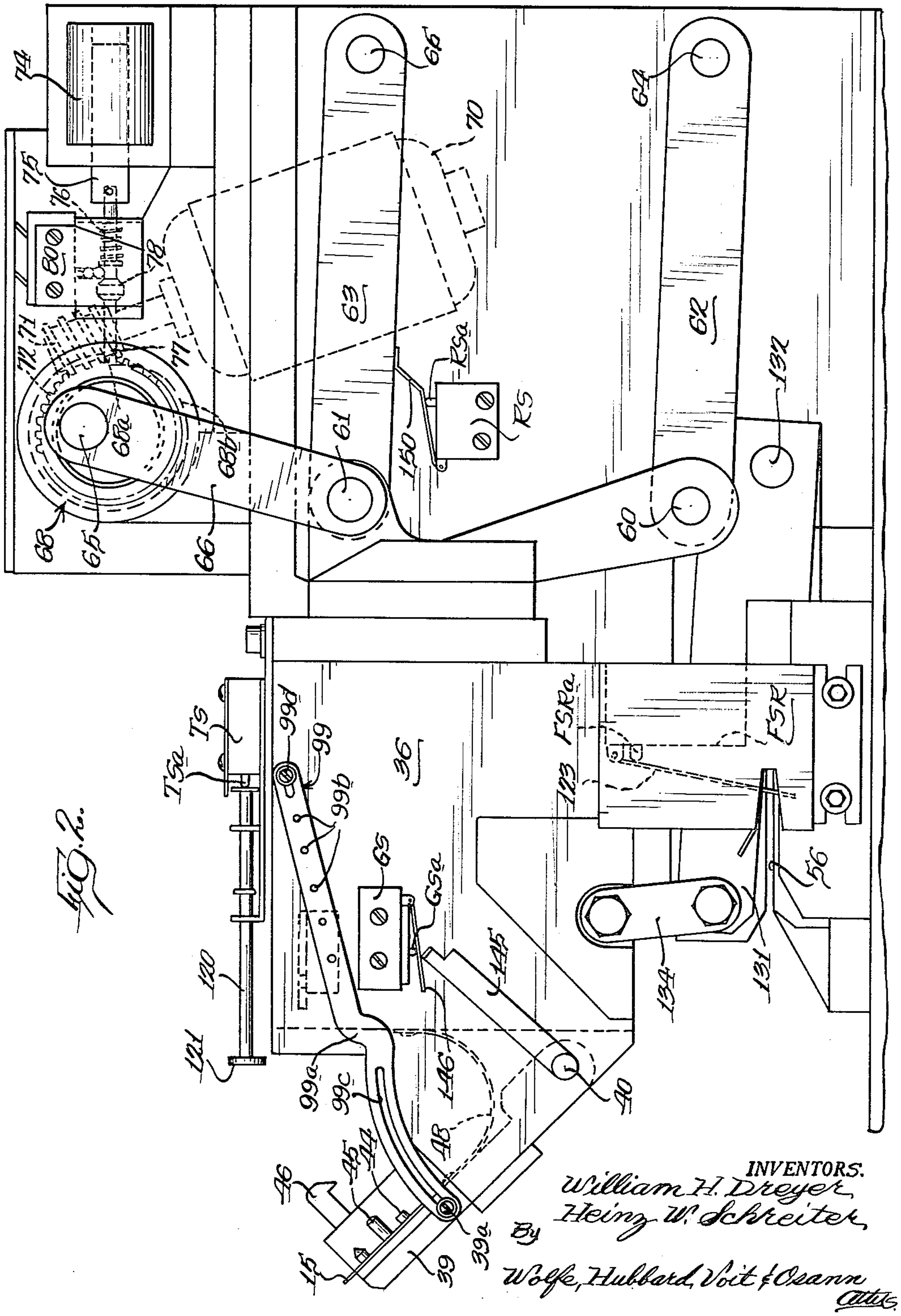
FIG. 2 is a right side elevation of the apparatus shown in FIG. 1.
Figure 3:
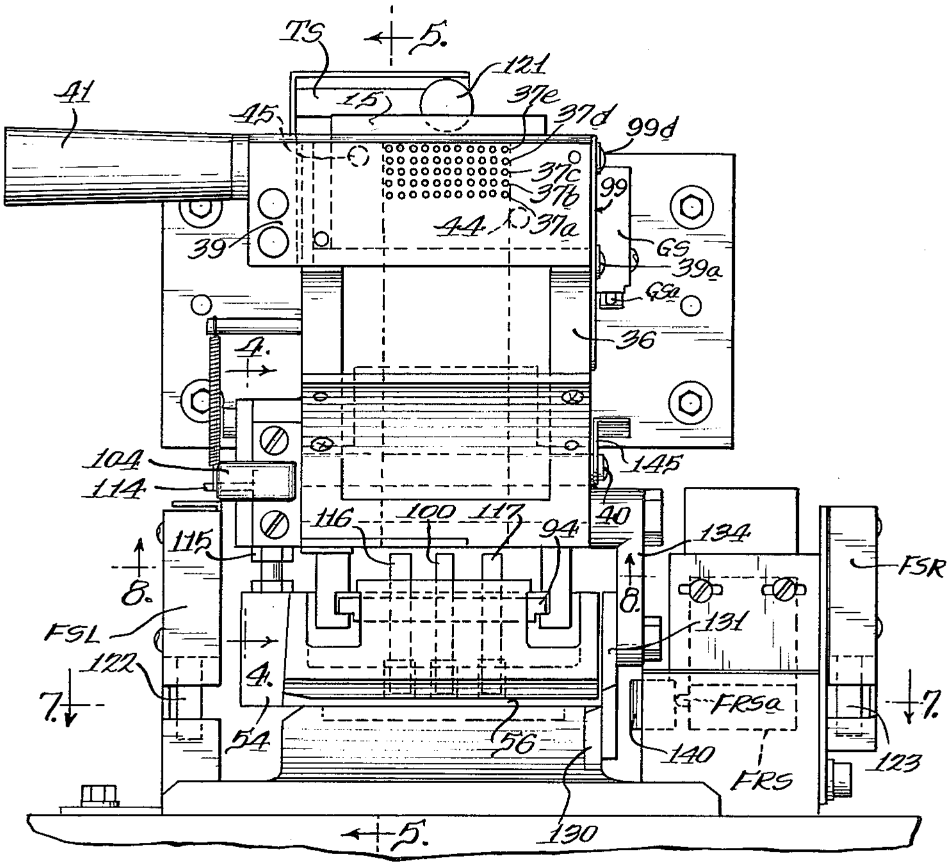
FIG. 3 is a fragmentary front elevation of the apparatus, the latter being shown with its gate in closed position.

In order to facilitate this operation so that it is both speeded up and rendered more immune from errors or mix-ups, provision is made to prevent operation of the machine if there should be no tag at all held by the gate 39 when the latter is closed. Moreover, the machine is prevented from operating except with the gate 39 fully closed. For this purpose, means are provided to sense when the gate 39 has been fully closed with the tag 15 held therein. Such means as here illustrated take the form of a "tag" sensing switch TS having an actuator TS*a* (FIG. 2) alined with a rod 120 having a head 121. Normally, the spring-biased actuator TS*a* projects outwardly from the switch TS and biases the rod 120 to the left as viewed in FIG. 2. However, when a tag has been placed on the locator studs 44, 45 of the gate 39 and the latter swung fully to its closed position (as shown in FIGS. 3 and 5), the tag 15 will engage the head 121 and shift the rod 120 inwardly to actuate the tag switch TS. The tag switch TS has normally open contacts TS1 shown in FIG. 12 and the function of these contacts in the over-all control circuitry will be described below.

It is also important in the operation of the present apparatus that the film strip be properly positioned beneath the punches 50*a*–50*e* and over the die block 55 before the head 36 executes its reciprocatory cycle. Accordingly, means are here provided to prevent operation of the machine until such time that the film strip 20 is properly positioned therein. For this purpose, film-sensing switches are disposed adjacent the slot 56 and provided with means to actuate the same only when the film is properly positioned in that slot.

Figure 7:
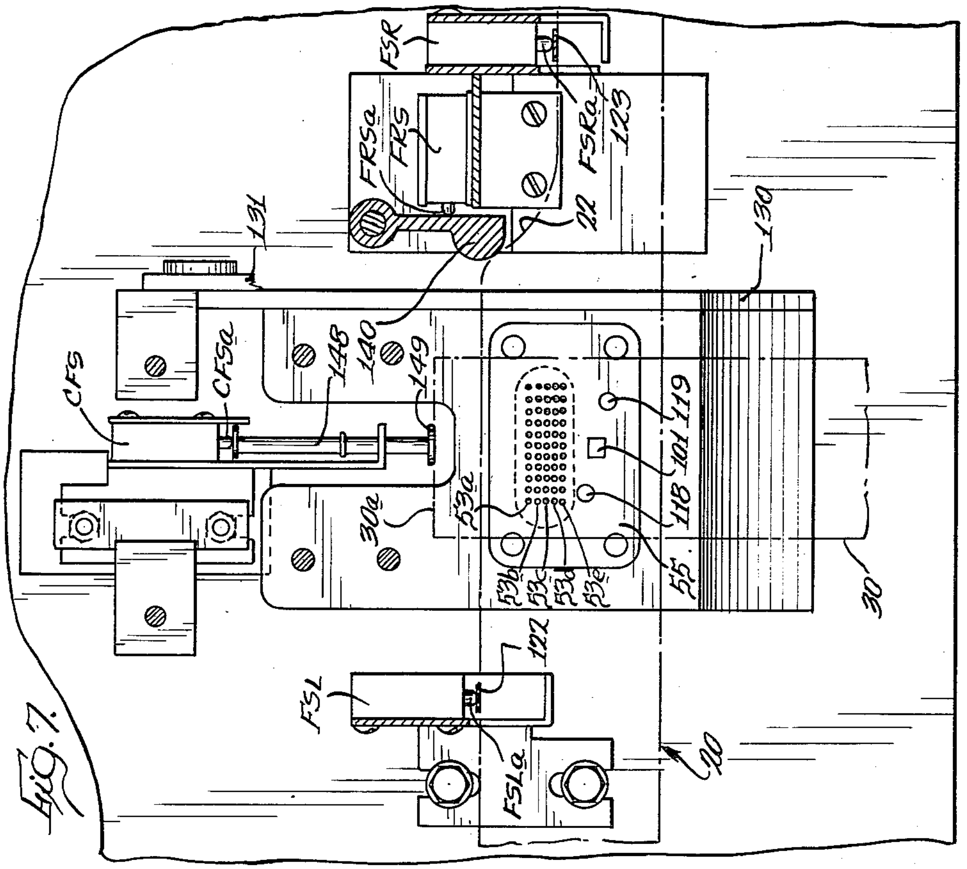
FIG. 7 is a sectional view taken substantially along the line 7—7 in FIG. 3 and showing the support surface which receives the second document or film which is to be perforated.

As shown best in FIG. 7, two film sensing switches FSL and FSR are mounted on the base 54, disposed respectively on the left and right sides of the die block 55. These switches are associated with depending levers 122 and 123 which are arranged to be deflected against and to depress the respective switch actuators FSL*a* and FSR*a*. When the film strip 20 is properly positioned in the slot 56 of the machine and shoved to the rear of that slot, then it will deflect the levers 122 and 123 to actuate both the switches FSL and FSR. It will be noted from FIG. 7 that the right film sensing switch FSR is mounted more nearly towards the front of the machine since its lever 123 is to be deflected by the edge of the thin tail 21 (FIG. 10) on the 35 mm. film strip. The film sensing switches FSL and FSR have contacts FSL1 and FSR1 which are normally opened and connected in the control circuitry of FIG. 12 as will be described below.

The present machine is intended to perform still another function. In duplicating perforations in a film strip 20 such as that shown in FIG. 10, it is desirable to cut off the reduced width tail 21 substantially along a line 125 spaced slightly inwardly from the curved or radius portion 22. In order to effect this cutting operation, the present apparatus includes a knife bed 130 and a knife blade 131, the knife being pivotally supported by a pintle 132 near its rear end (FIG. 2). The forward end of the knife 131 is connected by a link 134 to the head 36 so that each time the head executes a downward cycle of motion the knife 131 will be closed against the knife bed 130, thereby severing any film 20 which is disposed in the slot 56. The normal opening between the knife 131 and the bed 130 when the head 36 is fully raised is so small that there is no possibility or danger of the operator placing his fingers therebetween.

In order to assure that the film strip 20 has been located lengthwise in the slot 56 properly so that the knife 131 will sever it substantially along the line 125, a film radius switch FRS is provided together with means for actuating it when the film has been shifted lengthwise to the proper position. As shown best in FIG. 7, the film radius switch FRS is mounted with its biased actuator FRS*a* adjacent a pivoted lever 140 which is so disposed as to be rocked counterclockwise when the film strip 20 has been placed in the slot 56 and then shifted towards the right. The radius portion 22 of the film strip will engage the head of the lever 140 and shift the latter so that it depresses the switch actuator FRS*a*.

To substantially eliminate the possibility that an operator might forget to change the tag held by the gate 39 after one film strip has been perforated, and thus perforate a second film strip with the same pattern from the same tag, provision is made to assure that the tag gate 39 must be fully opened after the machine has executed one cycle of operation, and then reclosed before it can execute another cycle of operation. If the operator is forced to fully open the gate, it is most likely that he will remember to exchange the original tag 15 for a second tag before perforating the next film strip.

In order to accomplish this, a gate switch GS is mounted on the head 36 as shown in FIG. 2 and is associated with an arm 145 fixed to the shaft 40 which carries the gate 39. The arm 145 is so positioned on the shaft 40 with reference to the switch GS that it will engage and deflect a lever 146 to depress the switch actuator GS*a* only when the gate 39 is rocked to its fully opened position as shown in FIG. 2. When the gate 39 is closed, the arm 145 is free of the lever 146 and the switch GS is deactuated. This switch GS has normally open contacts GS1 shown in FIG. 12.

Three additional switches complete the control components. First, a manual by-pass switch BS (FIG. 1) is mounted at the base of the machine and includes a pushbutton which can be momentarily depressed by an operator. This by-pass switch BS has contacts BS1 in FIG. 12. Secondly, a center film sensing switch CFS is disposed on the base of the machine (FIG. 7) in a location so that it will be actuated when a wide film strip 30 (FIG. 11) is inserted endwise into the slot 56 to overlie the die block 55. As here shown, the center film switch CFS has an actuator CFS*a* adjacent a rod 148 having a head 149 which is engaged and shifted rearwardly by the end 30*a* of the film strip 30 when the latter is moved fully into the slot 56. Finally, a reset switch RS (FIG. 2) is disposed on the machine 56 in a manner such that it will be actuated as the head begins its downward movement. As here shown, the reset switch RS has an actuator RS*a* which is disposed beneath a lever 150 interposed in the path of the link 63. As the link 63 moves downwardly from its home position it will deflect the lever 150 and actuate the switch RS, and will then deactuate that switch as it returns to its home position.

With the foregoing in mind, the operation of the apparatus may now be summarized with particular reference to the schematic wiring diagram of FIG. 12. Assume first that the operator is to perforate a film strip 20 such as that shown in FIG. 10 with a pattern of perforations which correspond to those of an associated tag 15. First, the operator places the tag on the locator studs 44, 45 and closes the gate 39. This causes those ones of the probes 35*a*—35*e* which correspond to stations having perforations in the tag to be left stationary, and causes those probes which find no perforations in the corresponding stations of the tag to be shifted rearwardly. It also causes the rod 120 to be shifted rearwardly so that the tag switch TS is actuated and the contacts TS1 are closed.

Next, the operator slips the film strip 20 into the slot 56 with the radius portion 22 considerably to the left of the die block 55. This inward movement of the film strip 20 into the slot 56 causes the two film sensing switches FSL and FSR to be actuated, so that the contacts FSR1 and FSL1 in FIG. 12 are closed. Finally, the operator shifts the film strip 20 longitudinally to the right as viewed in FIG. 7 so that the radius portion 22 shifts the lever 140 which actuates the film radius switch FRS. Closure of the film radius switch contacts FRS1 in FIG. 12 thus results in the completion of an energizing circuit from the voltage supply line L1 through contacts FSR1, FRS1, FSL1 and TS1, as well as normally closed relay contacts R1 and the solenoid 74 to the opposite voltage supply line L2. With this, the solenoid 74 is energized so that its armature 75 (FIG. 2) is retracted, permitting the one-revolution clutch 68 to drive the eccentric 65 through one revolution. Simultaneously with the retraction of the armature 75, the cam 78 actuates the motor switch 80 so that its contacts 80*a* (FIG. 12) close to connect the motor 70 across the voltage supply lines L1, L2. Thus, the motor 70 is automatically started at the same time the one-revolution clutch 68 is conditioned to produce one revolution of the eccentric 65.

Accordingly, the head 36 begins its downward motion so that those particular punches 50*a*–50*e* (FIG. 5) which underlie those interposers 90*a*–90*e* left unshifted by the probes 35*a*–35*e* will move downwardly into the die block 55 and thus produce perforations in the film strip 20.

As soon as the head 36 begins its downward movement, the link 63 (FIG. 2) actuates the reset switch RS so that its contacts RS1 in FIG. 12 close. This creates an energization circuit for a relay R which controls the normally closed contacts R1 and normally open contacts R2. As soon as the relay R1 is energized, the contacts R1 open to de-energize the solenoid 74 and the contacts R2 close so that the relay R remains sealed in through the normally closed contacts GS1. When the solenoid 74 is de-energized by opening of the contacts R1, the motor switch contacts 80*a* remain closed since the pin 76 is riding on the camming surface 68*b* of the one-revolution clutch 68 and thus holds the cam 78 in a position to actuate the switch 80. Accordingly, the motor 70 continues to run until the eccentric 65 has gone through one complete revolution. At this time, the pin 76 snaps forwardly to re-engage with the shoulder 68*b* of the one-revolution clutch, and the cam 78, therefore, de-actuates the switch 80. The contacts 80*a* thus open to deenergize the motor 70.

The cycle of operation is complete at this time and the operator may remove the film strip 20 from the slot 56. If the operator should insert another film strip into the slot 56 and shift it to the right (FIG. 7) so as to actuate the sensing switches FSR, FSL and the film radius switch FRS, the machine would not execute a second cycle of operation because the relay R is sealed in and its contacts R1 are at this time open to prevent a second energization of the solenoid 74. Only after the operator swings the gate 39 to a fully open position so that the lever 145 actuates the switch GS to momentarily open the contacts GS1 and drop out the relay R is it possible for a second cycle of operation to be commenced.

Thus, if the operator opens the gate 39 and changes the tag therein, then recloses the gate and places the second film strip in the slot 56, the machine will reproduce the perforations of the second tag in the second film strip.

It will be seen from the foregoing that since the solenoid 74 can be energized only when the contacts FSR1, FRS1, FSL1 and TS1 are all closed, it is not possible for the machine to operate when a film strip is improperly positioned therein. Moreover, it is impossible for the machine to operate unless a tag 15 is carried by the gate 39, and unless the gate is fully closed to make the tag shift the rod 120 and actuate the tag switch TS.

In some instances, film similar to the film strip shown in FIG. 10 is to be perforated with a pattern, except that the film has no reduced width or tail portion 21. In this case, it is not necessary to utilize the film radius switch FRS and the right film sensing switch FSR. Accordingly, as shown in FIG. 12, the by-pass switch contacts B1 are connected in parallel with the contacts FSR1 and FRS1. If a film strip 20 having no tail 21 thereon is placed in the slot 56 so as to actuate the left-hand film sensing switch FSL1, and if a tag is in the closed gate 39 to actuate the tag switch TS, the operator need only momentarily depress the by-pass switch B1 to complete an energizing circuit for the solenoid 74. With this, the operation of the apparatus proceeds as previously described. Thus, it will be apparent that by the provision of the by-pass switch BS, it is possible to utilize the present apparatus with 35 mm. film strips having no reduced width leader 21.

In those instances where wider film strips such as that shown at 30 in FIG. 11 are to be processed, they are simply inserted end-wise into the slot 56 to overlie the die block 55. This, as previously noted from FIG. 7, actuates the center film switch CFS. As shown in FIG. 12, this latter switch has normally open contacts CFS1 which lead directly from the line L1 through the tag switch contacts TS1, the relay contacts R1, and the solenoid 74 to the line L2. Therefore, when a wide film strip 30 is to be perforated by the present apparatus, the accompanying tag 15 need only be placed in the closed gate 39, and the film strip inserted end-wise into the slot 56 sufficiently to actuate the center film switch CFS.

We claim as our invention:

1. In perforation reproducing apparatus, the combination comprising a plurality of probes disposed in a rectangular array of rows and columns, means mounting said probes with their first ends alined but with freedom for each to yieldingly shift in an end-wise direction, the probes in successive rows being of progressively greater length, a plurality of movable relay arms disposed in a rectangular array with each having one end thereof disposed opposite the second end of a corresponding one of said probes, the arms in successive rows being progressively less in length with the arms of greatest length opposite the probes of least length, a plurality of punches disposed in a rectangular array of rows and columns, with the adjacent rows of punches more closely spaced than the adjacent rows of said probes, means mounting said punches with their first ends alined but with freedom for each to yieldingly shift in an end-wise direction, the punches in successive rows being of progressively greater length, a plurality of movable interposers disposed in a rectangular array with each having one end disposed opposite the second end of a corresponding one of said punches, means for shifting each of said interposers away from the second end of the corresponding one of said punches in response to movement by a corresponding one of said arms as a result of shifting of a corresponding one of said probes, and means for moving all of said interposers in a direction parallel to said punches so that those particular punches, corresponding to those ones of said probes which are not shifted, will be moved with an end-wise punching motion.

2. In apparatus for reproducing perforations from the field of a first document into a field on a second document, the combination comprising a base, a head reciprocable toward and away from said base, power means for moving said head through reciprocating strokes, a plurality of probes movably mounted on said head and spaced according to the stations of a perforation field, a gate mounted on said head and movable between open and closed positions, said gate including means for orienting the perforation field in the first document relative to said plurality of probes so that when said gate is moved to the closed position those probes which find no corresponding perforation in the document are displaced, a plurality of punches movably mounted on said base and disposed in a rectangular array corresponding to a perforation field, a slot defined in said base opposite the ends of said punches to receive the second document, a plurality of interposers carried by said head and normally engageable with respective ones of said punches to shift the latter when the head is reciprocated, means for shifting clear of the corresponding punches, those of said interposers which correspond to those ones of said probes which are displaced, and means for preventing operation of said power means unless said gate is closed with a first document properly oriented therein and unless a second document is simultaneously present and properly oriented in said slot opposite said punches.

3. In apparatus for reproducing perforations from the field of a first document into a field on a second document, the combination comprising a base, a head reciprocable toward and away from said base, power means for moving said head through reciprocating strokes, a plurality of probes movably mounted on said head and spaced according to the stations of a perforation field, a gate movable between open and closed positions for pressing the first document against said probes to displace those ones which find no corresponding perforation in the document, a plurality of punches movably mounted on said base and disposed in a rectangular array corresponding to a perforation field, a slot defined in said base opposite the ends of said punches to receive the second document, a plurality of interposers carried by said head and normally engageable with respective ones of said punches to shift the latter when the head is reciprocated, means for shifting clear of the corresponding punches, those of said interposers which correspond to those ones of said probes which are displaced, a first switch and means engaged by a first document in said gate only when the latter is closed for actuating such first switch, a second switch and means engaged by a second document in said slot for actuating such switch, a third switch and means engaged by a second document in said slot for actuating such switch, means responsive to the actuation of said first, second and third switches for causing said power means to move said head through one reciprocating stroke, and means for preventing further operation of said power means until said gate is first opened.

4. In apparatus for reproducing perforations from the field of a first document into a second document, the combination comprising a base, a head reciprocable relative to said base, power means for moving said head through reciprocating strokes, a gate carried by said head and movable between opened and closed positions, means associated with said gate for receiving a first document and sensing the perforations therein when the gate is closed, a plurality of punches on said base and selectively movable to produce perforations in a second document, means on said head responsive to said sensing means for moving those particular punches which correspond to perforations in the document held by said gate as the head executes a cycle of reciprocation, means for initiating operation of said power means, means for terminating operation of said power means when the head has completed one cycle of reciprocation, means for disabling said initiating means as an incident to operation of said power means, and means responsive to opening of said gate for enabling said initiating means.

5. In a perforation duplicator, the combination comprising a base, a head reciprocable toward and away from said base, a plurality of individually movable probes disposed in a rectangular array on said head, means for pressing a first perforated document against said probes to displace only those ones which find no correspondingly located perforation in the document, a plurality of individually movable punches disposed in a rectangular array on said base, a plurality of interposer linkages on said head each including means overlying one of said punches to move it through a working stroke as the head reciprocates in response to the corresponding one of said probes being undisplaced by the first document, means for receiving a second document opposite said punches so that the perforations of the first document are reproduced in the second, a special code punch on said base, an opening defined in said head above said code punch so that the latter is normally not shifted when the head reciprocates, an interposer on said head manually movable to a position overlying said code punch, means for biasing said interposer to a position clear of said code punch, means for latching said interposer in said overlying position, and means for releasing said latch means each time said head is fully advanced toward said base.

6. In a perforation duplicator, selectively operable special indicia applying means comprising, in combination, a base, a head reciprocable toward and away from said base, a special punch carried by said base and movable relative thereto in a direction parallel to the direction of head reciprocation, a pushbutton on said head and manually shiftable against biasing means acting thereon, a snap-acting latch for locking said pushbutton in its shifted position, an interposer on said head connected to said pushbutton and moved when the latter is shifted to a position overlying one end of said special punch to cause a working stroke of the latter upon reciprocation of the head, and means for releasing said latch as an incident to completion of the movement of said head toward said base, so that said pushbutton must be affirmatively pushed once for each reciprocation of the head during which said special punch is to be effective.

7. In apparatus for producing a perforation pattern from the field of stations of a first record member in a second record member, the combination comprising a plurality of probes arrayed to register with the stations in the perforation field of the first record member, means mounting said probes for end-wise movement, means including a gate member movable between first and second positions for retracting or shifting the first record member away from or against said probes to cause in the latter instance end-wise shifting of those which find no perforation in the corresponding station of such member, a plurality of punches each corresponding to one of said probes and mounted for end-wise movement, a plurality of interposers each normally overlying one end of a corresponding one of said punches, a plurality of relay arms each disposed opposite the rear end of one of said probes, means yieldably biasing said arms toward said probes so that each arm is deflected when the corresponding probe is shifted rearwardly, means coupling one end of each of said interposers with a respective one of said arms so that each interposer is independently retracted upon deflection of its associated arm, a comb-like member having a frame piece and a plurality of tooth pieces, said tooth pieces each extending behind all of said arms associated with one of the rows of probes, and a lost-motion connection between said frame piece and said gate member for pulling all of said tooth pieces forwardly when said gate is opened.

References Cited in the file of this patent

UNITED STATES PATENTS

| | | |
|---|---|---|
| 1,015,619 | Fleming | Jan. 23, 1912 |
| 1,732,982 | Neville | Oct. 22, 1929 |
| 1,812,620 | Braitmayer | June 30, 1931 |
| 1,817,631 | Lake et al. | Aug. 4, 1931 |
| 2,668,494 | Grosman et al. | Feb. 9, 1954 |
| 2,770,304 | Tholstrup | Nov. 13, 1956 |
| 2,791,275 | Hooe | May 7, 1957 |